US010893337B2

(12) United States Patent
Rivera

(10) Patent No.: US 10,893,337 B2
(45) Date of Patent: *Jan. 12, 2021

(54) ADVANCED WIRELESS IPTV SMART TELEVISION

(71) Applicant: Manolo Fabio Rivera, Elmhurst, NY (US)

(72) Inventor: Manolo Fabio Rivera, Elmhurst, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/002,700

(22) Filed: Jun. 7, 2018

(65) Prior Publication Data

US 2019/0379945 A1 Dec. 12, 2019

(51) Int. Cl.
*H04N 21/61* (2011.01)
*H04N 21/41* (2011.01)
*H04B 17/318* (2015.01)
*H04W 76/10* (2018.01)

(52) U.S. Cl.
CPC ....... *H04N 21/6181* (2013.01); *H04B 17/318* (2015.01); *H04N 21/41* (2013.01); *H04N 21/6125* (2013.01); *H04N 21/6131* (2013.01); *H04N 21/6175* (2013.01); *H04W 76/10* (2018.02)

(58) Field of Classification Search
CPC .............. H04N 21/6181; H04N 21/41; H04N 21/6125; H04N 21/6175; H04N 21/6131; H04B 17/318; H04W 76/10
See application file for complete search history.

(56) References Cited

U.S. PATENT DOCUMENTS

| | | | | |
|---|---|---|---|---|
| 6,028,600 A | * | 2/2000 | Rosin | H04N 21/2385 348/38 |
| 2003/0176161 A1 | * | 9/2003 | Dale | H04L 1/0003 455/3.01 |
| 2009/0031352 A1 | * | 1/2009 | Ho | H04N 5/44543 725/40 |
| 2009/0047016 A1 | * | 2/2009 | Bernard | H04L 12/5692 398/43 |
| 2009/0245133 A1 | * | 10/2009 | Gupta | H04W 48/14 370/254 |
| 2011/0004893 A1 | * | 1/2011 | Borislow | H04N 7/165 725/25 |
| 2011/0023074 A1 | * | 1/2011 | Nguyen | H04N 17/00 725/110 |
| 2012/0137332 A1 | * | 5/2012 | Kumar | H04N 21/26606 725/62 |
| 2012/0304238 A1 | * | 11/2012 | Rivera | H04N 21/643 725/110 |

* cited by examiner

*Primary Examiner* — Hai V Tran
(74) *Attorney, Agent, or Firm* — Jie Tan; JT Law Services PC

(57) ABSTRACT

A wireless IPTV SMART TV is provided with plurality of wireless modem modules configured to receive a plurality of wireless broadband connection signals synchronized from a plurality of cellular data networks, to process the plurality of wireless broadband connection signals, identify a set of data corresponding to a strongest wireless broadband connection signal strength, and convert said data into IPTV signals based on said IPTV provider access.

17 Claims, 8 Drawing Sheets

ADVANCED WIRELESS IPTV SMART TELEVISION

CROSS-REFERENCE TO RELATED APPLICATIONS

This application is a continuation-in-part for U.S. patent application Ser. No. 14/599,345-filed on Jan. 16, 2015 which is a continuation of U.S. patent application Ser. No. 14/330,266 filed on Jul. 14, 2014 that is a continuation of U.S. patent application Ser. No. 13/374,721 filed on Jan. 10, 2012 which claims the priority from U.S. provisional application Ser. No. 61/431,476 filed on 11 Jan. 2011. The aforementioned applications are incorporated by reference in their entirety herewith.

FIELD OF THE INVENTION

The present invention relates to a wireless smart television, More specifically it relates to a smart wireless television that incorporates advanced wireless Set Top Box features and can receive, convert and display IPTV signals carried by cellular networks or other wireless carrier signals.

BACKGROUND OF THE INVENTION

There are four ways to receive and watch television programs: cable TV, satellite TV, IPTV and over-the-counter streaming services (OTT). Cable TV programs from providers are delivered through coaxial cable connection, while satellite TV programs from providers are delivered through radio waves. OTT streaming is that television programs from third party services are delivered through the public internet while IPTV programs from providers are delivered through the internet via managed-network such as content delivery networks (CDN). While OTT streaming and IPTV both use Internet Protocol to deliver content through the server-client model in which the consumer requests and receives content via the Internet Protocol, OTT streamed content comes over from the same open and unmanaged network as web browsing while IPTV uses a private, managed content delivery network (CDN) to achieve a higher quality of service. Rather than streaming content directly to your browser, IPTV content goes from your router to a set-top box to display on your TV.

IPTV essentially has two components: (1) internet protocol that specifies the format of the packets and addressing scheme provided by the provider, (2) television medium of communication that transmits pictures and sounds. There are key differences between IPTV and internet video in that IPTV is delivered in continuous streams selected through channels while internet video consists of discrete data segments and are stored in files.

IPTV uses IP protocol to deliver multicasting TV, VoD, triple play, VoIP, and so on, to consumers via broadband connections with a QoS guarantee. IPTV has unique features in addition to simply broadcasting ordinary TV programs over the Internet. Successful deployment of IPTV services requires excellent QoS for video, voice, and data. QoS metrics for video include jitter, number of out-of-sequence packets, packet-loss probability, network fault probability, multicast join time, delay, etc. QoS metrics for voice include mean opinion score (MOS), jitter, delay, voice packet loss rate, etc. QoS metrics for IPTV services include channel availability, channel start time, channel change time, channel change failure rate, and etc.

A major benefit of IPTV is that new building construction can forego the need of setting up a coaxial network for television broadcast. Audio and video can instead be received via a phone line through DSL technology or wireless cellular network through G2-G3, G4 or other broadband technology such as Wi-Fi Hotspot networks.

In the managed CDN network, CDN nodes are usually deployed in multiple locations, often over multiple backbones so that the content can be delivered to the consumer at the shortest distance or at the most cost effective way. Benefits include reducing bandwidth costs, improving page load times, or increasing global availability of content. The number of nodes and servers making up a CDN varies, depending on the architecture, some reaching thousands of nodes with tens of thousands of servers on many remote points of presence (PoPs). Others build a global network and have a small number of geographical PoPs. Requests for content are typically algorithmically directed to nodes that are optimal in some way. When optimizing for performance, locations that are best for serving content to the user may be chosen. This may be measured by choosing locations that are the fewest hops, the least number of network seconds away from the requesting client, or the highest availability in terms of server performance (both current and historical), so as to optimize delivery across local networks.

For IPTV signals, voice, video, and data packets are carried over IP from customer premises equipment (CPE) to a DSL access multiplexer (DSLAM), which then routes or switches them toward the core network. Voice packets are encapsulated by Real Time Protocol (RTP) and User Datagram Protocol (UDP) before being sent to the IP layer. At the CPE, multiple sources such as two IPTV video and audio channels, voice over IP (VoIP) phone, and Internet access (via fixed PC or WLANs) are aggregated together via DSL services. With wired DSL system, there is the problem of "last mile" or "last kilometer" that is the final leg of delivering connectivity from a telecommunication provider to a customer.

To solve the problem of providing enhanced services over the last mile, some firms have been mixing networks for decades. One example is fixed wireless access, where a wireless network is used instead of wires to connect a stationary terminal to the wire line network. Various solutions are also being developed which are seen as an alternative to the "last mile" of standard incumbent local exchange carriers: these include WiMAX and BPL (Broadband over Power Line) applications. WiMAX (Worldwide Interoperability for Microwave Access) is a telecommunications protocol that provides fixed and fully mobile internet access. WiMAX is described as "a standards-based technology enabling the delivery of last mile wireless broadband access as an alternative to cable and DSL."

Among the various versions, the 802.16-2004 version of WiMAX, 802.16d, is sometimes referred to as "Fixed WiMAX," has no support for mobility, while 802.16e-2005, also known as "Mobile WiMAX", introduced support for mobility. Mobile WiMAX has developed the most commercial interest to date and is being actively deployed in many countries. Mobile WiMAX is also the basis of future revisions of WiMAX. For purposes of this disclosure, WiMAX is used to refer to both standards interchangeably.

The bandwidth and range of WiMAX make it suitable for providing fixed and portable mobile broadband connectivity across cities and countries through a variety of devices. It can be used to reliably and cost effectively provide a wireless broadband alternative to cable and DSL for "last mile" broadband access. Broadband internet access, of course, facilitates providing data, telecommunications VoIP and IPTV services triple play, gaming services and the like services that are traditionally only available to end users via a cable, DSL, or satellite receiver.

As more and more companies are deploying WiMAX to provide mobile broadband or at-home broadband connectivity across whole cities or countries, this has resulted in competition in markets which typically only had access to broadband through an existing incumbent DSL (or similar) operator. Additionally, given the relatively low cost to deploy a WiMAX network in comparison to GSM, DSL or Fiber-Optic, it is now possible to provide broadband in places where it might have been previously economically unviable.

Unfortunately, despite the proliferation of wireless technologies, end user equipment suffer from the fact that a particular wireless modem may not be supported by the various actual network infrastructure deployed in a given area. IPTV user devices, such as digital televisions including high definition televisions (HDTVs), must have the IPTV features that (1) users must be able to select their TV programs with fast channel selection and short channel changing time; (2) users must be able to store TV programs in local storage devices so that users can watch them anytime; furthermore, service providers should be able to store at least 100 hours of TV programs and videos; (3) for the QoS to be guaranteed; a standard definition TV and a high definition TV need bandwidth of at least 1~4 Mb/s and 4~12 Mb/s, respectively.

There can be many IPTV transmission related problems: such as limited bandwidth, unexpected traffic pattern, mismatch between encoder setting and decoder capabilities, loss of video feed, excess of error rates of video feed, streams not conforming to specifications etc. The QoS of video and voice traffic can not be guaranteed if either there are too many video/voice flows, or there is too much Internet access traffic (e.g., downloading large files such as movies). IPTV services are defined by application experience, so-called quality of experience (QoE), such as the number of channels provided, quality of video, functionality. It is difficult to translate between QoE and QoS. Traditional televisions also have the issue of the hardware being designed to operate in different frequency bands than the available frequency bands to a user.

Advanced wireless IPTV set top boxes (STB) that analyze data traffic under all available frequencies for improved QoE have been developed by this inventor.

On the other hand, a smart TV, sometimes referred to as connected TV or hybrid TV, has been developed to provide OTT streaming services with integrated Internet and interactive "Web 2.0" browser features. Smart TV is a technological convergence between computers and flatscreen television sets. Besides the traditional functions of television sets that are provided through traditional broadcasting media, smart TVs can also provide Internet TV, online interactive media as well as on-demand streaming media, and home networking access.

Smart TV should not be confused with Internet TV, IPTV or Web television. Internet TV refers to receiving television content over the Internet Protocol instead of traditional systems of broadcasting through terrestrial, cable and satellite methods.

Smart Televisions have preloaded operating systems or made available through the set-top box. The software applications or "apps" can be preloaded into the device, or updated or installed on demand via an app store or marketplace. The technology that enables smart TVs is also incorporated in external devices such as Blu-ray players, and some game consoles, digital media players, hotel television systems, Blu-ray players, and other network-connected interactive devices that utilize television-type display outputs. These devices allow viewers to find and play videos, movies, TV shows, photos and other content from the internet Web, cable or satellite TV channel, or from a local storage device. SMART TV establishes platforms that allow access to movies, shows, video games through apps, and those apps include Netflix, Spotify, YouTube, and Amazon.

Smart TV platforms or middleware have a public software development kit (SDK) and/or native development kit (NDK) for apps so that third-party developers can develop applications for it, and an app store so that the end-users can install and uninstall apps themselves. The public SDK enables third-party companies and other interactive application developers to "write" applications once and see them run successfully on any device that supports the SMART TV platform or middleware architecture which it was written for, no matter who the hardware manufacturer is. These can run applications (sometimes available via an 'app store' digital distribution platform), interactive on-demand media, personalized communications, and have social networking features.

SMART TV devices also provide access to user-generated content (either stored on an external hard drive or in cloud storage) and to interactive services and Internet applications, such as YouTube, many using HTTP Live Streaming (also known as HLS) adaptive streaming. SMART TV devices facilitate the curation of traditional content by combining information from the Internet with content from TV providers. Services offer users a means to track and receive reminders about shows or sporting events, as well as the ability to change channels for immediate viewing. Some devices feature additional interactive organic user interface/natural user interface technologies for navigation controls and other human interaction with a SMART TV, with such as second screen companion devices, spatial gestures input like with Xbox Kinect, and even for speech recognition for natural language user interface.

There are many SMART TV platforms used for specific individual purposes. For example, HbbTV by the Hybrid Broadcast Broadband TV association, CE-HTML as part of Web4CE, OIPF as part of HbbTV, and Tru2way are framework platforms managed by technology businesses. Other include: Android TV, Boxee, Firefox OS, Frog, Google TV, Horizon TV, httvLink, Inview, Kodi Entertainment Center, MeeGo, Mediaroom, OpenTV, Opera TV, Plex, Roku, RDK, which is Reference Development Kit, SMART TV Alliance, ToFu Media Platform, Ubuntu TV, and Yahoo! SMART TV are framework platforms managed by individual companies.

Many vendors provide SMART TV platforms, including Amazon, Apple, Google, Haier, Hisense, Hitachi, Insigna, LG, Microsoft, Netgear, Panasonic, Philips, Samsung, Sharp, Sony, TCL, TiVO, Toshiba, Sling Media, Western Digital, Sony, Panasonic, Samsung, LG, and Roku TV, among some of best SMART TV platforms.

Currently SMART TV is designed to preferably connect to a cabled IP broadband network over a wireless broadband connection, such as for example a Wi-Fi network. Such design offers a disadvantage, as in rural areas the cable companies do not have access to provide internet services, users would not be able to connect their SMART TV to the internet network. Therefore it is desirable to have a SMART TV that has the flexibility of working as a conventional wired SMART TV and also address the disadvantages of conventional SMART TV.

Because OTT content is delivered via the public Internet rather than dedicated CDNs like IPTV, it is subject to all the same blockages and limitations as your regular internet. Potentially the biggest limitation being the implementation of data caps by ISPs. Long buffering times, slow speeds during peak Internet usage hours, and poorly-configured home Wi-Fi networks all contribute to slowing down the quality of OTT content streams.

IPTV uses a process known as packet switching to encode video into small chunks of data and send them piecemeal to designated IP addresses (specifically, the IP address of your computer or set-top box when you request content). The process is the same for VOIP, which delivers telephone-type voice communications over Internet Protocol. Again, what differentiates IPTV from generic streaming is that it comes to the consumer over a privately managed CDN, resulting in overall higher quality of service. The other big difference between IPTV and other video content delivered via the Internet is that IPTV is a paid subscription service direct from the telecom company or ISP, much like cable or satellite. This helps pay for the CDN, and delivers a TV experience more similar to traditional broadcast TV, albeit with interactive functionality built-in.

Wireless Telco CDNs have advantages over traditional CDNs because they own the networks over which video content is transmitted. They own the last mile and can deliver content closer to the end user because it can be cached deep in their networks. This deep caching minimizes the distance that video data travels over the general Internet and delivers it more quickly and reliably. Telco CDNs also have a built-in cost advantage since traditional CDNs must lease bandwidth from them and build the operator's margin into their own cost model. In addition, by operating their own content delivery infrastructure, telco operators have a better control over the utilization of their resources. Content management operations performed by CDNs are usually applied without (or with very limited) information about the network (e.g., topology, utilization etc.) of the telco-operators with which they interact or have business relationships.

It is desirable to advanced wireless smart TV that can receive, process and display IPTV signals.

SUMMARY OF THE INVENTION

The present disclosure is directed to an advanced wireless IP STB connectable to a SMART TV or a SMART TV that incorporates features of the IP STB, with multiple built-in antennas capable of capturing plural downstream transmissions simultaneously on dedicated receivers using different modem technologies without the use of wires to the home.

The Advanced wireless IP STB or a SMART television is able to receive multiply sourced data traffic, including, for example, IPTV, digital TV, web TV, radio web, internet chat: written, voice and video, GPS tracking locator signals, media player web support, web based video gaming, You Tube and the like video streaming, TV surveillance, video intercom surveillance, and much more.

In one embodiment, the advanced wireless IP STB or SMART TV is configured to be able to establish a broadband (internet) session through previously assigned or negotiated channel assignments between one or more modems and plural remote wireless infrastructures deployed in a municipality, such as WIMAX, LTE, WCDMA, CDMA 1×, TDSCMA, GSM, GPRS, EDGE or the like.

The STB or SMART TV analyzes the data traffic on all available wireless frequency bands available in the region to receive and establish a broadband connection, and uses appropriate provider access metrics, priority schemes, and the like, to establish multiple links to one or more websites on the internet. Each link can be a a simple broadcast link, a unicast link, or a multicast link, depending on the modem capabilities, the desired user data traffic, and QoS requirements.

In one embodiment, an IPTV provider includes as its service offering downloadable applications which provide provider access metrics and other web functions, web-based gaming, and other user applications. In this way, content providers ensure being fairly compensated by partnering agreements that reduce the motivation of end-users to download illegal content. Easy access to legal content also benefits end users as who benefit from knowing the source of downloaded material is safe and thus more likely to seek to download.

In another embodiment, the IPTV provider negotiates with one or more network carriers to secure proprietary frequency allocation in order to better control bandwidth and scheduling resources, and in this way also provide a broader range of services.

In another embodiment, by introducing a delay in transmission signals on the network end, the IP TV provider is able to have the hardware in the IPTV STB or SMART TV to manage a sufficient time to determine the bandwidth capacity of a different wireless technology capable of handling data traffic (e.g., IPTV, VoIP, web TV, or other content being downloaded or streamed) to maximize user experience (QoE).

A SMART TV incorporating the features of an advanced IPTV set top box has been detailed in the following embodiments.

According one embodiment of the invention, a SMART TV comprises of a plurality of wireless modem modules, wherein each wireless modem module is configured to receive a plurality of wireless broadband connection signals from a plurality of cellular data networks and to process the plurality of wireless broadband connection signals according to a different respective wireless communication standard. A processor is communicatively coupled to the wireless modem modules, the processor is configured to establish using at least two of the wireless modem modules a plurality of wireless network links between the SMART TV and at least one cellular data network, receive, using each of the at least two wireless modem modules to the respective set of data transmitted through one of the network links through synchronization, determine a wireless broadband connection signal strength associated with each set of data, and data traffic of this wireless broadband connection, identify from the received sets of data, a set of data corresponding to a strongest wireless broadband connection signal strength, determine internet protocol television (IPTV) provider access based on the set of data corresponding to the strongest wireless broadband connection signal strength and convert said data into IPTV signals based on said IPTV provider access. A display unit is communicatively coupled to the processor and is adapted to receive the signals corresponding to the IPTV signals which are processed to generate content and render the generated content.

According another embodiment, the wireless network links are concurrently established over a plurality of cellular networks.

According to yet another embodiment, the wireless communication standards include at least one of WiGiG, mmwave, LTE Advanced Pro 4.5G, 4.5G Pro, 4.9G, Pre-5G, 5G Project, 3GPP Long Term Evolution (LTE) or any newly assigned frequency bands or wider spectral bandwidth per frequency channel (1G up to 30 kHz, 2G up to 200 kHz, 3G up to 5 MHz, and 4G up to 20 MHz), According to a further embodiment, the processor of the SMART TV is configured to obtain through at least some of the wireless network links additional data from at least one content provider communicatively coupled to at least one wireless data network, wherein the content provider is different from the IPTV providers and determine content data based on the data obtained from the content provider.

According to another embodiment of the SMART TV, the processor is configured to transmit an output signal corresponding to the content data to the display unit communicatively coupled to the processor.

According to yet another embodiment of the SMART TV, the content data comprises at least one of a user application, a webpage, an e-mail message, video conferencing data, and voice over internet protocol (VOIP) data.

According to one embodiment of the SMART TV, the wireless network links include at least one of a broadcast link, a unicast link, and a multicast link.

According to another embodiment of the SMART TV, the processor is configured to establish the plurality of wireless network links between the SMART TV and the at least one wireless data network based on a quality of service requirement.

According to a further embodiment of the SMART TV, the processor is configured to establish the plurality of wireless network links between the SMART TV and the at least one wireless data network based on data traffic.

According to yet another embodiment of the SMART TV, the at least one wireless data network comprises at least two wireless data networks and the processor is configured to establish the plurality of wireless network links between the SMART TV and the at least two wireless data networks, such the at least two wireless data networks are operated by at least two different network carriers.

According to one embodiment, the SMART TV comprises a remote control for controlling operations of the SMART TV.

According to another embodiment, the SMART TV comprises a memory. The memory is adapted to store one or more computing application, the display unit is adapted to execute one of the computing application, and on execution, the display unit is adapted to receive the signals corresponding to the IPTV signals, and to process the signals to generate a content, and to render the generated content.

According to yet another embodiment, the SMART TV comprises a hotspot module and a wireless transmitter. The hotspot module is adapted to extend at least one of the plurality of wireless broadband signals to the wireless transmitter, wherein the wireless transmitter is further adapted to establish communication coupling to one or more computing devices and adapted to transmit the broadband signals to the computing devices.

According to a further embodiment of the SMART TV, the output signals correspond to live and/or on-demand content.

According to another embodiment of the SMART TV, strength of the wireless broadband connection is between 1 Gbps to 20 Gbps. According to yet another embodiment of the SMART TV, at least one of the Cellular data network is carried on unlicensed spectrum including mobile Millimeter-wave transceivers, WiGig will allow multi-gigabit data transfer by means of millimeter wave (mm-wave) 7 Gbit/s, 10 Gbit/s, 20 Gbit/s, multi-gigabit, SDR platform.

According to one embodiment of the SMART TV, at least one of the wireless modem modules is enabled with 256 quadrature amplitude modulation (QAM) technique.

According to another embodiment of the SMART TV, the wireless modem modules comprise one or more antennas adapted to receive plurality of wireless broadband connection signals from the plurality of cellular data networks, and at least one of the antennas is adapted to associate with Massive MIMO technology.

According to yet another embodiment of the SMART TV, the wireless modem modules comprises one or more SIM card slots adapted to store at least one SIM card where of SIM card authorize or provide services to subscribers over the licensed spectrum a mobile network operator or MNO, also known as a wireless service provider, wireless carrier, cellular company, or mobile network carrier, is a provider of wireless communications services.

According to a further embodiment of the SMART TV, the wireless modem modules is adapted to receive at least one wireless broadband connection signal from at least one cellular data networks or from a mobile network operator or MNO, also known as a wireless service provider, wireless carrier, cellular company, or mobile network carrier, is a provider of wireless communications services that owns or controls all the elements necessary to sell and deliver services to an end user including radio spectrum allocation, wireless network infrastructure, back haul infrastructure, billing, customer care, provisioning computer systems.

According to yet another embodiment of the SMART TV, often allows the user to install and run more advanced applications or plugins/addons based on a specific platform. SMART TV, run a complete operating system or mobile operating system software providing a platform for application developers.

According to yet another embodiment of the SMART TV, allow viewers to find and play videos, movies, TV shows, photos and other content from the Web, cable or satellite TV channel, also provide Internet TV, online interactive media, over-the-top content (OTT), as well as on-demand streaming media, and home networking access.

According to yet another embodiment of the SMART TV, deliver content (such as photos, movies and music) from other computers or network attached storage devices on a network using either a Digital Living Network Alliance/ Universal Plug and Play media server or similar service program like Windows Media Player or Network-attached storage (NAS), or via iTunes. It also provides access to Internet-based services including traditional broadcast TV channels, catch-up services, video-on-demand (VOD), electronic program guide, interactive advertising, personalisation, voting, games, social networking, and other multimedia applications. SMART TV enables access to movies, shows, video games, apps and more. Some of those apps include Netflix, Spotify, YouTube, directv now, facebook tv, playStation Vue, YouTubeTV, Hulu live, FuboTV, Amazon, or any (vMVPDs) Virtual Multichannel Video Programming Distributors aggregate live and on-demand linear television but deliver the content over the internet.

According to yet another embodiment of the SMART TV, also incorporate this platforms with partnership agreements or license agreements. For example, HbbTV by the Hybrid Broadcast Broadband TV association, CE-HTML as part of Web4CE, OIPF as part of HbbTV, and Tru2way are framework platforms managed by technology businesses. Other include: Android TV, Boxee, Layer3 TV, Firefox OS, Frog, Google TV, Horizon TV, httvLink, Inview, Kodi Entertainment Center, MeeGo, Mediaroom, OpenTV, Opera TV, Plex, Roku, RDK, which is Reference Development Kit, SMART TV Alliance, ToFu Media Platform, Ubuntu TV, and Yahoo! SMART TV are framework platforms managed by individual companies.

DETAILED DESCRIPTION OF THE PREFERRED EMBODIMENTS

Figure 1A:
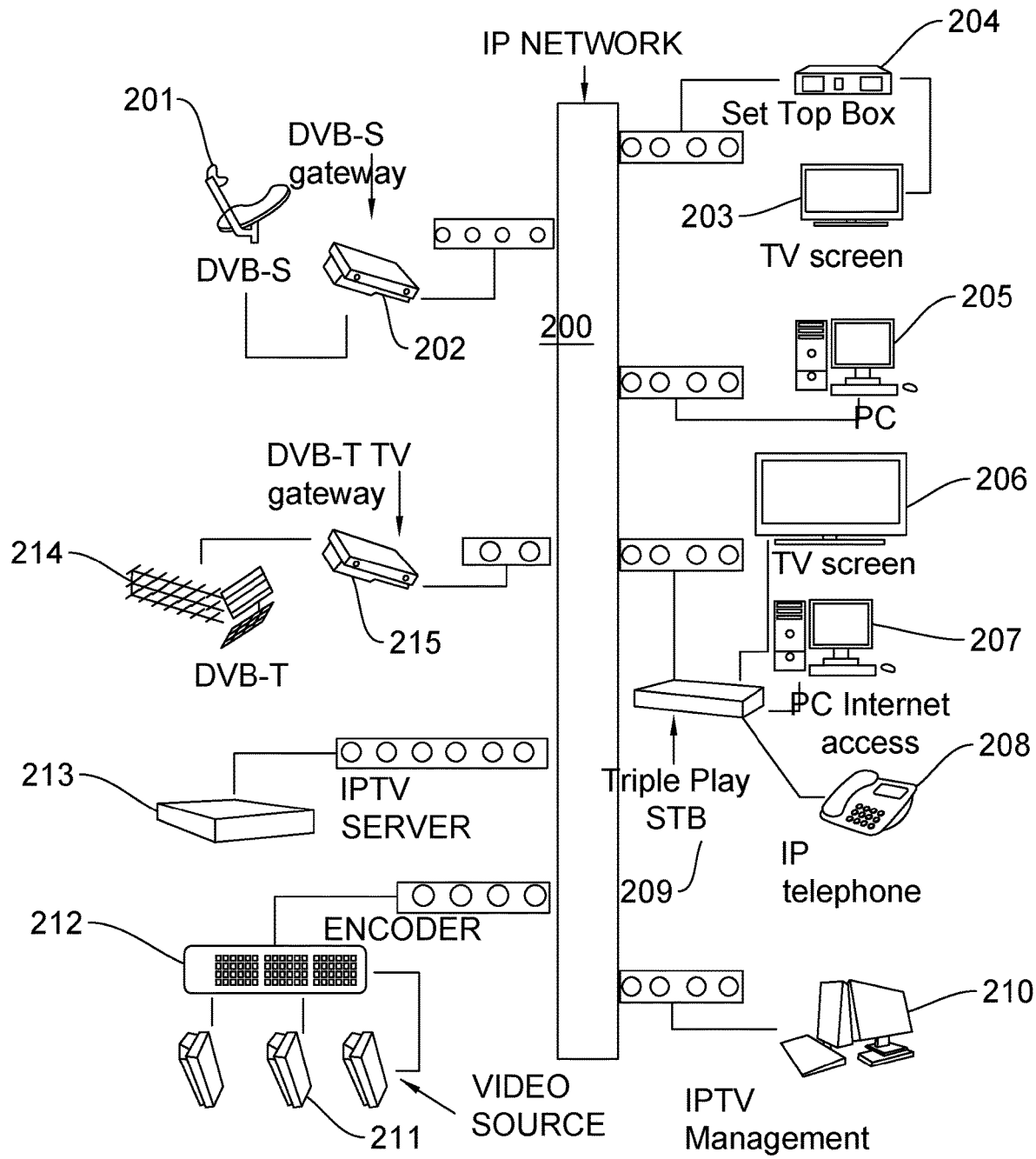
FIG. 1A is an example of an end-to-end IPTV system.

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

Modem technology refers to the signal conversion and demodulation technology from one format to another format. For example, between the types of conventional DSL signals, Asymmetric DSL (ADSL), High-Data-Rate DSL (HDSL), Single-line DSL (SDSL), and Very-high-data-rate DSL (VDSL) all are provisioned via modem pairs, with one modem located at a central office and the other at the customer site to demodulate data signals from carrier signals. Depends on transmission methods, there are DSL, cable or satellite modems, a wireless WiMAX, WiFi or the like wireless telecommunications modems.

The present disclosure is directed to an advanced wireless IP STB or SMART TV having features of the advanced wireless IP STB, with multiple built-in antennas capable of capturing plural downstream transmissions simultaneously on dedicated receivers using different modem technologies.

The advanced wireless IP STB or SMART TV is able to receive multiply sourced data traffic, including, for example, IPTV, digital TV, web TV, radio web, internet chat: written, voice and video, GPS tracking locator signals, media player web support, web based video gaming, You Tube and the like video streaming, TV surveillance, video intercom surveillance, and much more.

In one scenario, the advanced wireless IP STB or SMART TV is configured to be able to establish a broadband (internet) session through previously assigned or negotiated channel assignments between one or more modems and plural remote wireless infrastructures widely deployed in a municipality, such as WIMAX, LTE, WCDMA, CDMA 1x, TDSCMA, GSM, GPRS, EDGE or the like.

The STB or SMART TV analyzes the data traffic on all available frequency bands available to receive and establish a broadband connection, and uses appropriate metrics, priority schemes, and the like, to establish multiple links to one or more websites on the internet. Each link can be a simple broadcast link, a unicast link, or a multicast link, depending on the modem capabilities, the desired user data traffic, and quality of service requirements.

The IPTV provider includes as its service offering downloadable applications, web-based gaming, and other user applications. In this way, content providers ensure being fairly compensated by partnering agreements that reduce the motivation of end-users to download illegal content. Easy access to legal content also benefits end users as who benefit from knowing the source of downloaded material is safe and thus more likely to seek to download.

The IPTV provider can also negotiate with one or more network carriers to secure proprietary frequency allocation in order to better control bandwidth and scheduling resources, and in this way also provide a broader range of services.

By introducing a delay in transmission signals on the network end, the IPTV provider is able to have the hardware in the IPTV STB manage a sufficient time to determine the bandwidth capacity of a different wireless technology capable of handling data traffic (e.g., IPTV, VoIP, web TV, or other content being downloaded or streamed) to maximize user experience.

FIG. 1A is an example of an end-to-end IPTV network system, as shown, it comprises head-end equipment include the IP Network 200, IPTV Management or Management Middleware 210, Video Source 211, IPTV Server 213, Digital Video Broadcasting-Terristrial (DVB-T) TV gateway 215, DVB-T 214, Digital Video Broadcasting-Satallite (DVB-S) 201, DVB-S TV gateway 202, and user-end equipment 203, 204, 205, 206, 207, 208 coupled via a broadband IP network 200 to receive appropriate audio/video and general IP traffic data.

Figure 1B:
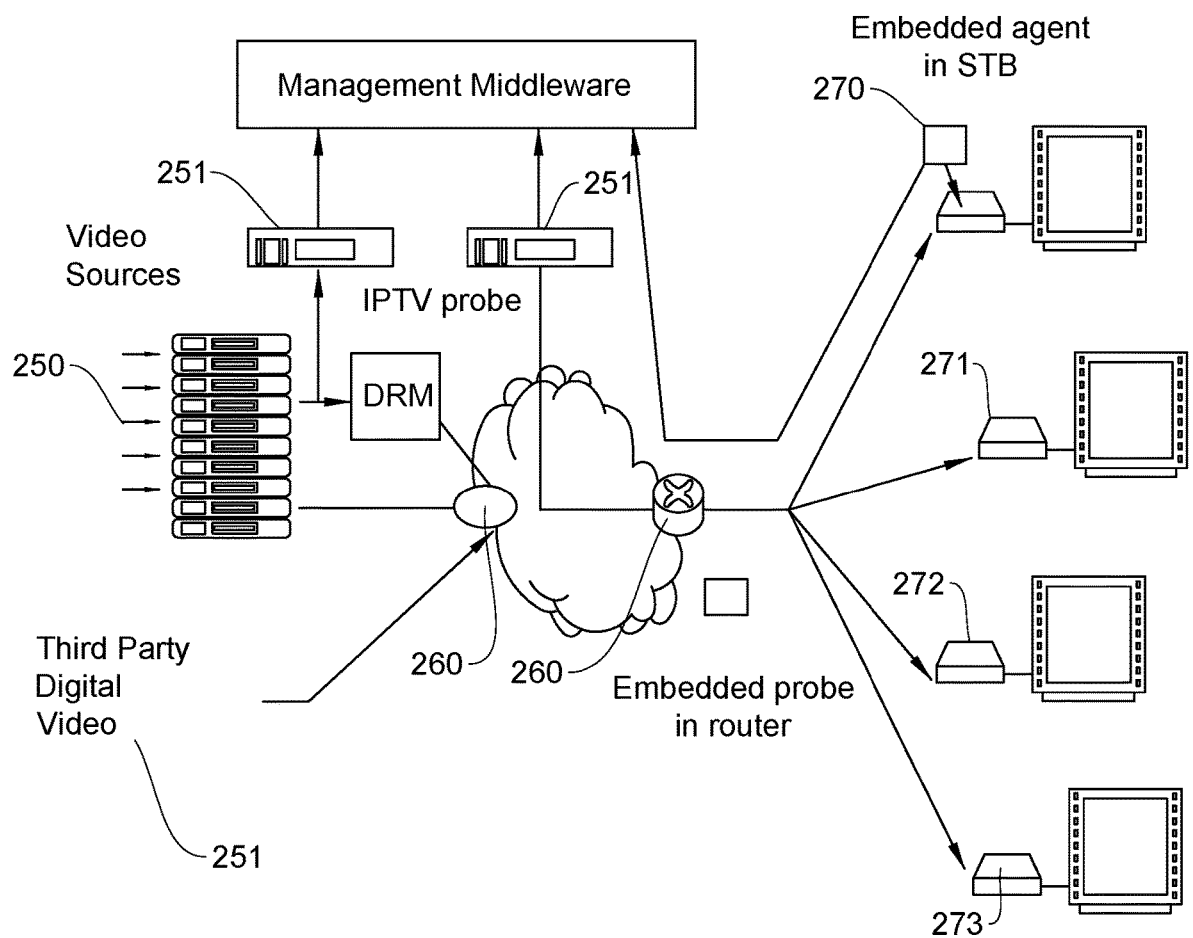
FIG. 1B demonstrates an example content delivery process through IPTV signals and network.

In reference to FIG. 1B, an example of IPTV signal flow is shown. The head-end equipment includes a streaming server 250, a video server 251, and a level III device 260. The streaming server 250 encodes and streams live streams in real-time and pre-encoded streams that are stored on the video server 251. The streaming server transmits the streams to the switch or router 260 which transfers them over the backbone to the central/remote offices and from there to the end user location.

Video servers 251 fulfill several purposes. For store and forward transmissions, video servers store digitally encoded content and stream it through level III devices 260 via operators' networking infrastructure. Video servers 251 receive newly encoded digital content that is uploaded from the streaming server. Video servers also enable time shifted TV applications. Viewers at home can then watch any program at a time convenient to them.

A level III device 260 is a switch or router that supports multicast transmission. The router or switch resides at the head-end, interfacing with the network. Another router or switch 260 receives data at the central office and transmits either to DSLAMS located there, or directly to equipment in the user end.

The user-end equipment 270, 271, 272, and 273 is coupled to the broadband IP network and configured to receive the TV/IP stream. The user end may include an external or internally integrated modem, such as a DSL, cable or satellite modem, or may be a wireless WiMAX, WiFi or the like wireless telecommunications modem. This modem receives the stream from the DSLAM or Level III device and transfers it directly to the user-end equipment, for example a PC for display on the desktop or to the IP STB for display directly on a SMART TV. An IP STB 270 functions as a gateway between the SMART TV set or PC and the broadband IP network via a PSTN, satellite or cable link. In this regard, an IP STB provides all the necessary signal processing—receiving, and decoding/decompressing, as well as also accepts commands from the user and transmits these commands back to the network, often through a back channel.

The above described advanced IP STBs are capable of functioning, among other ways, as a TV signal receiver, a modem, a game console, a web browser, as well as support e-mail capabilities, video-conferencing, and IP telephony over a broadband network link. In addition, advanced IP STBs may be equipped with additional components and functionality such as with Electronic Program Guide (EPG), CD ROM, DVD player, and the like.

IPTV network capable STB 100 includes bandwidth dimensioning as IPTV and VoD services require high bandwidth capacities and predictable performance, placing additional requirements on the network. It takes into consideration compression and coding technology transmission rate requirements. The key parts include hardware, a data network interface, a decoder, a memory buffer, and synchronization hardware routines.

As shown in FIGS. 1A and 1B, the content source signal starts at the provider's local distribution facility or service center, from there, through carrier radio frequency signal that constitutes all the cable channels on offer, is modulated for transmission through fiber or wireless carrier frequency, switching to local network once it reaches a node in the local neighborhood. At the local node, the signal is demodulated to enter the coaxial cable that stretches to a user residence. For wireless transmission, either a set-top box or the television itself decodes the signal and displays the data as video and audio on the television. When switch channels, the user is "tuning in" to the various frequencies included in the subscription plan. User subscription access is managed via encryption. Signal is encrypted before it leaves the headend, and decrypted by keys on the user's end. Once an antenna has picked up the signal, it's generally decoded by a set-top box to allow the consumer to "tune in" to different channels, much like cable TV.

Conventional STBs capable of IPTV functionality have a common disadvantage in that the link to the IP network backend is via a wired link into the home IP address, be it from the cable to the home, the wire from the satellite to the set top box, or the wire to the DSL modem. The solution herein eliminates the need for wires to the home. A SMART TV or The advanced IPTV STB being able to receive plural wireless broadband connections, and does so in a manner without compromising quality of service requirements or bandwidth challenges of the wireless environment.

In a preferred embodiment, the advanced wireless IP STB or the SMART TV includes a WIMAX modem or 5G modem for establishing a link or multiple links to the widely deployed WIMAX infrastructure from which IPTV signal reception is possible and made available to owners of the STB or SMART TV either through a dynamically assigned frequency or by a dedicated frequency assignment associated with the STB or the SMART TV. In the latter instance, it is contemplated that the service provider owns IPTV capable transmission frequencies over for example, a 4G radio network such as WIMAX, or alternatively, over a 3.5G or 3G radio network 5G mm Wave.

In an illustrative embodiment, in order to analyze the best radio resource (WIMAX, LTE, 3G, 2G, mmWave, etc) to assign contemporaneously occurring functions in the STB or SMART TV, such handling of IPTV, voice telephony, and internet browsing simultaneously, synchronization algorithms are provided which receive the various broadband data traffic from each resource, buffering it to optimize its handling, and at same time, introduce a small transmission frame delay, to make the overall frequency allocation/reallocation and resource handling as transparent as possible.

Figure 2A:
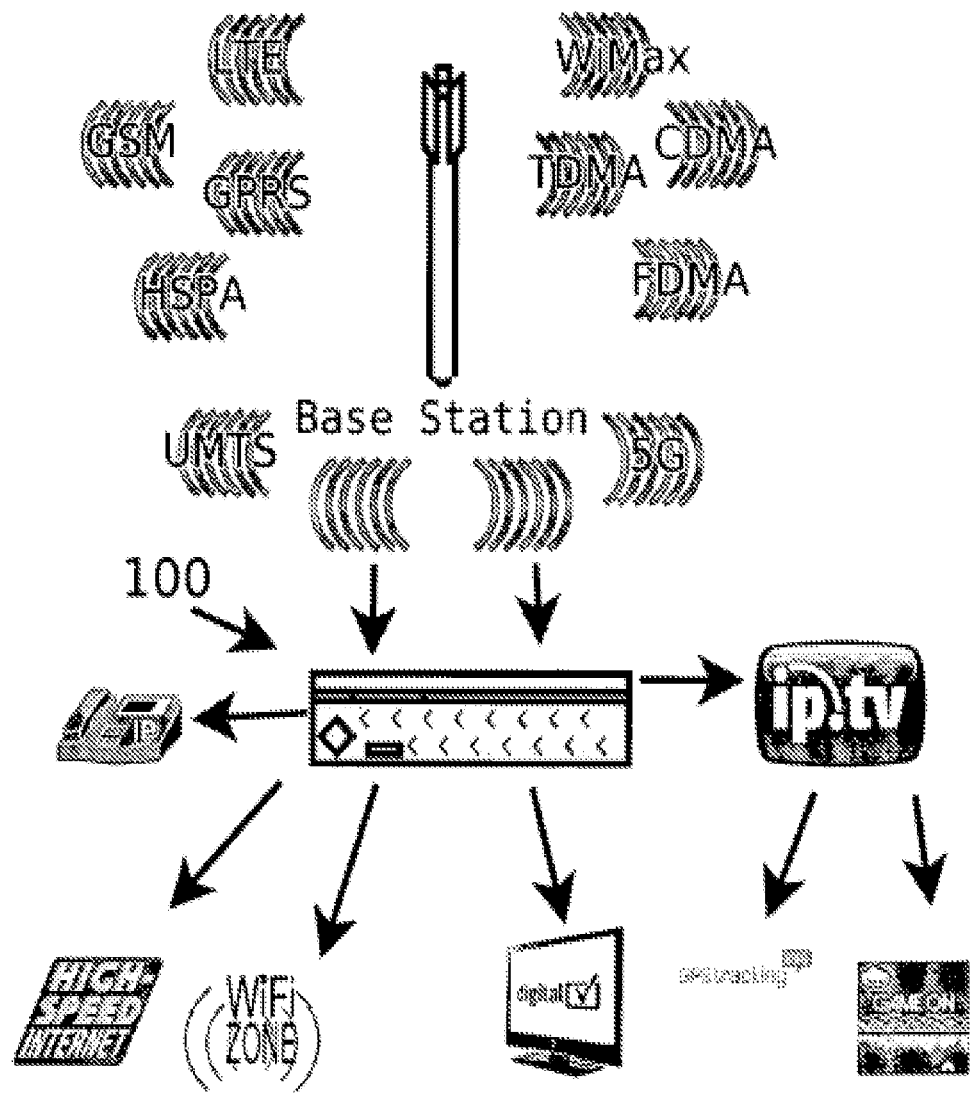
FIG. 2A demonstrates an example set of functionalities of an example wireless IPTV set top box in accordance with this application.

A number of exemplary embodiments will now be described with reference to FIGS. 2A to 2B. FIG. 2A is a functional block diagram of an advanced IPTV set top box (STB) 100 and FIG. 2B is smart TV 300 with IPTV capabitlity in accordance with a preferred embodiment.

STB 100 or smart TV 300 is configured to operate over different wireless communication protocols, using built-in antennas (not shown). The wireless communication protocols comprise both short range communication links (e.g., WiFi, Bluetooth) as well as long range wireless communication links (e.g., GSM, GPRS, LTE, HSPA, WiMAX, CDMA. TDMA, FDMA, UMTS and 5G radio technologies). In accordance with the preferred embodiment, STB 100 or smart TV 300 provides IPTV, gaming services, GPS tracking services, digital TV, WiFi zone services, high speed internet, VoIP services, and other unicast, multicast and broadcast IP services directly through one or more of the above mentioned wireless links.

Figure 2B:
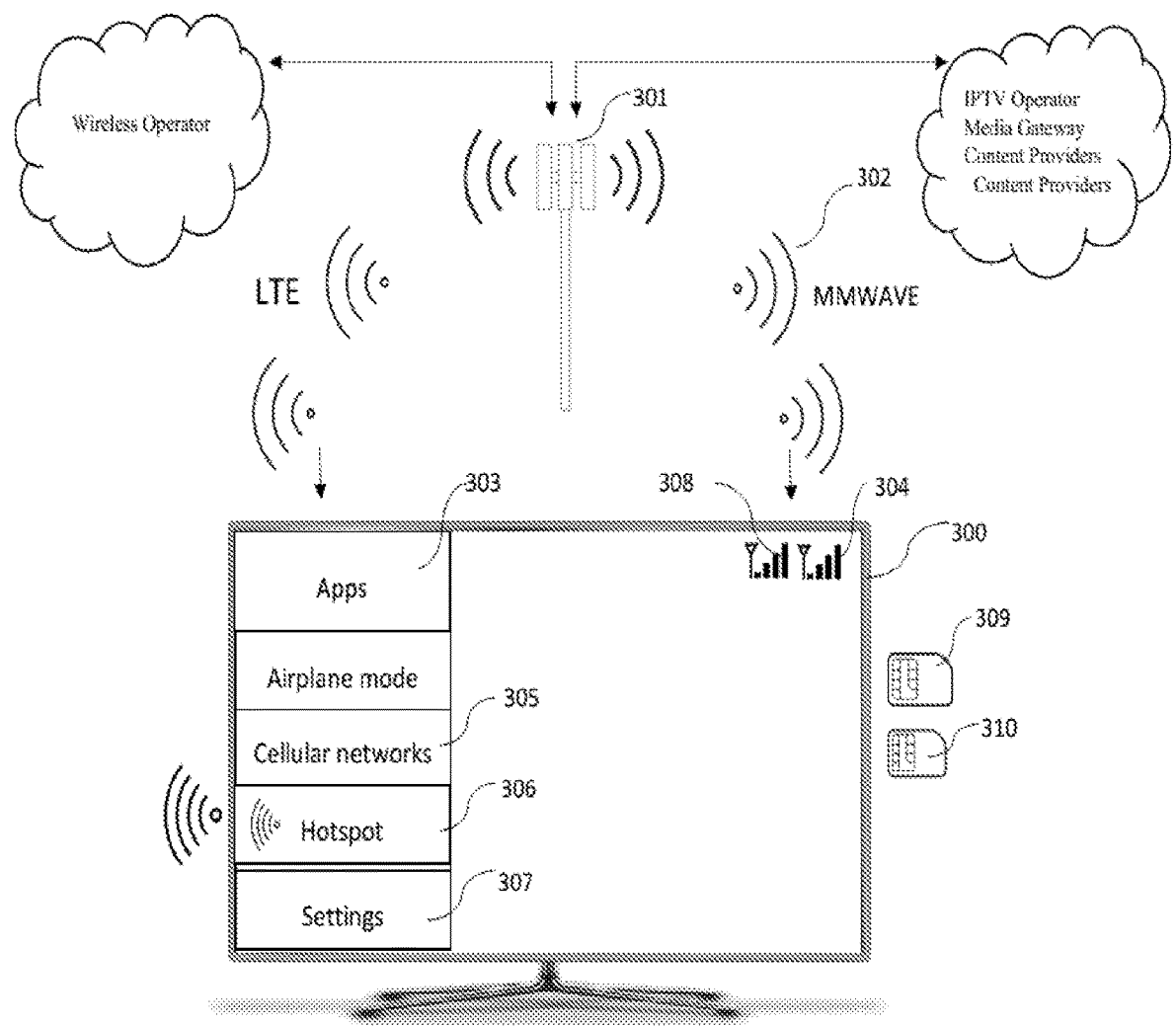
FIG. 2B demonstrates an example set of functionalities of an example wireless SMART TV in accordance with this application.

In reference to FIG. 2B, an example user interface of SMART TV 300 is shown. SMART TV 300 incorporates all the board diagrams that are referenced in FIGS. 3 to 6, in additional to all the hardware components of a standard television. As shown, STB 100 or SMART TV 300 includes a TFT LCD Panel or display panel for display the user interface.

IPTV capable SMART TV 300 is configured to receive signals from wireless provider 301, which sends cellular signals various carrier formats, such as in mmwave, LTE Advanced Pro 4.5G, 4.5G Pro, 4.9G, Pre-5G, 5G Project or 3GPP Long Term Evolution (LTE) with speed of upto 1 to 20 Gbit/s (301, 302 and 305). SMART TV 300 is capable of data reception in 5G communication standards including 256 Quadrature amplitude modulation (QAM) technique, Massive MIMO, LTE-Unlicensed etc. SMART TV 300 is capable of reception of multiple wireless broadband connection signals simultaneously from at least two SIM cards 309 and 310, in order to have the authorization of mobile data from one or two wireless providers at the same time in the SMART TV 300. Settings 307 is provided to control multiple functions of the SMART TV 300.

The SMART TV comprises a hotspot module 306 which is capable of transmitting multiple wireless broadband signals to a wireless transmitter for establishing communication to other computing devices and transmitting the received broadband signals to the said computing devices. Apps 303 indicates the various video streaming services provided by SMART TV, these services include Sling TV, Netflix, Google voice etc. SMART TV 300 is provided with International Mobile Equipment Identity number which is adapted to identify devices used in conjunction with Subscriber Identification Module (SIM) cards and prevents misuse of any device which has been reported as lost/stolen by a SIM card subscriber.

Figure 3:
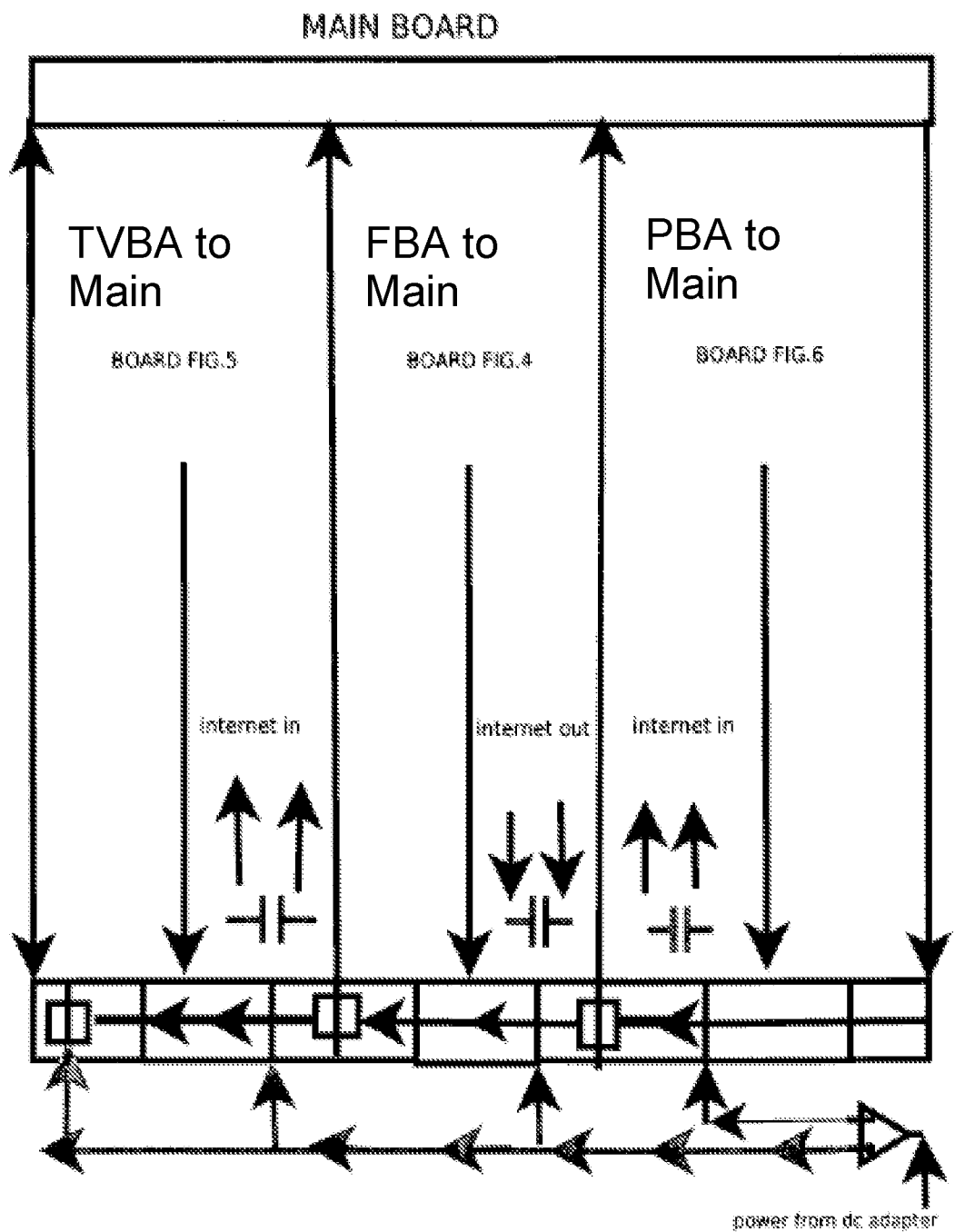
FIG. 3 illustrates a diagram of an example functional main processing board of a SMART TV in accordance with this application.

In reference to FIG. 3, a functional diagram of a main board of the STB 100 or SMART TV 300 is shown. As shown, STB 100 or SMART TV 300 includes a main board or multiple units of main boards comprising: Slot SIM CARD, 5G modems, processors system on a chip, display module coupled to frequency board assembly (FBA), IPTV board assembly (TVBA), and phone board assembly (PBA), shown in greater detail in FIGS. 4-6, respectively.

Figure 4:
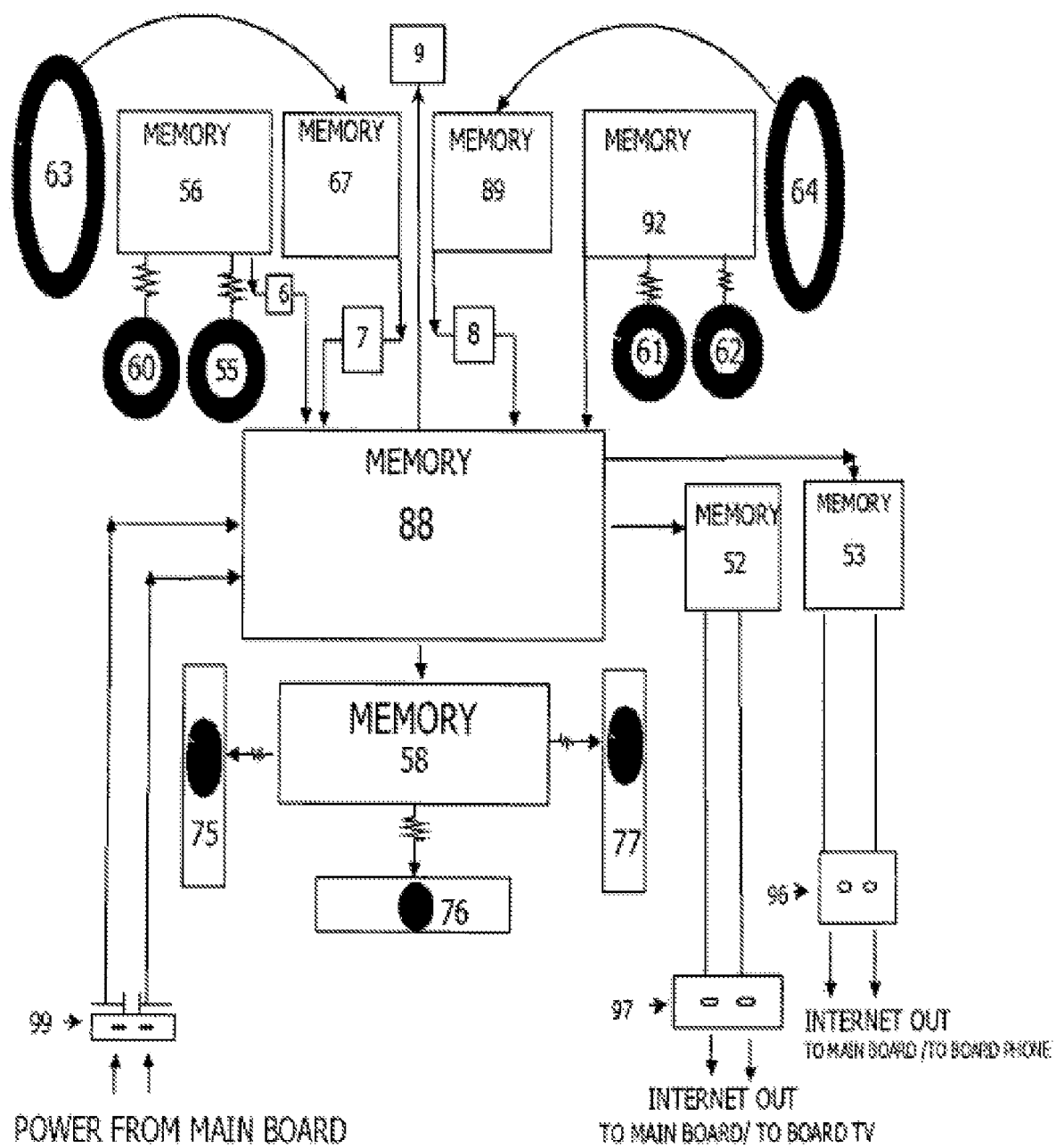
FIG. 4 is an example block diagram of the frequency board assembly (FBA) of a SMART TV in accordance with this application.

In reference to FIG. 4, FBA includes a set of multiple antennas (55, 60, 61, 62, 63, 64). These antennas capture IP data packets and other RF signals transmitted from one of the associated wireless links over frequencies set by the STB 100 or SMART TV 300 in cooperation with the wireless service provider. The SMART TV 300 that incorporates at least one board that has one or more SIM card slots 63, 64, which are adapted to store at least one SIM card configured to receive at least one wireless broadband connection signal authorization from wireless service providers. A SIM card contains its unique serial number (ICCID), international mobile subscriber identity (IMSI) number, security authentication and ciphering information, temporary information related to the local network, a list of the services the user has access to and additionally provides two passwords: a personal identification number (PIN) for ordinary use, and a personal unblocking code (PUC) for PIN unlocking.

The SIM card slots 63, 64, which contains a SIM card coupled to antennas 55, 60, 61, 62 which capture RF signals. The captured RF signals are stored in and across a number of modem or memory banks (56, 67, 89, 92), which are coupled to the SIM card slots containing a SIM card that already has signal authorization from wireless service providers. The modem or memory banks (56, 67, 89, 92), are processed/demodulated using known techniques, filtered by filters or network interface 7, 8, receives set of broadband signals from modem and eventually stored as a set of signals from various sources in addressable locations in processor or memory (CPU block) 88. Synchronization algorithms are provided which receive the various broadband data traffic from each resource, buffering it to optimize its handling, and at same time, introduce a small transmission frame delay, to make the overall frequency allocation/reallocation and resource.

Antennas 55 and 60 capture RF signals and send them to element 56, where decode action takes place and the signal is delivered to filter 6 to clean it, and then gets into memory 88. Similarly, antenna 63 captures the related and corresponding RF signals and sends them to element 67, where decode action takes place and the signal is delivered to filter 7 to clean it, and then gets into memory 88. Finally, antennas 61 and 62 capture the related and RF signals and send them to element 92, where decode action takes place and the signal is delivered into SQLIVE software application of Telchemy, Inc or memory 88. Synchronization between the multiple antennas and modems is conducted through a synchronization algorithm and control module. Data traffic from each resource is analyzed, a small transmission frame delay is made to make the overall frequency allocation/reallocation and resource to guarantee a QoS.

Memory 88 processed the information delivered to identify a strongest signal received and its associated wireless broadband signals. This data signal is converted into multimedia (audio/video) IP packets or and transports them to memory 58.

The IP packets in memory or processor 58 also are further amplified by an appropriate WiFi transmitter (not shown). The processor 58 also functions as a hotspot module and a wireless transmitter. In one exemplary embodiment, these packets are then transmitted from WiFi antennas 75, 76, and 77 at a range up to 300 to 2500 Mbps (at frequency of 2.4-2.462 GHz 5 GHz).

Additional IP packets from memory 88 arrive at memory 52. Memory 52 is coupled via an internal wired interface to the TVBA of STB 100 or SMART TV 300. This internal wired interface terminates at output connection 97. Output connection 97 in turn is coupled to the input connection 35 of the IPTV board assembly shown in FIG. 5. [0104] Alternatively, IP packets from memory 88 are forwarded to memory 53 which is coupled via internal wired output connection 96 to PBA of STB 100 or SMART TV 300. This wired output connection 96 in turn is coupled to the input connection 43 of PBA shown in FIG. 6.

In another embodiment, memory 88 is connected to a personal computer or other portable multimedia device via wired interface 9. Wired interface 9 could be an RJ45 interface, USB, or other high speed IP packet data link.

Memory 88 includes a main processor (not shown) and optionally includes a plurality of memory elements, each separately addressable, along with the other functional blocks, and powered by a power input connection 99 coupled to the main board in FIG. 3.

Figure 5:
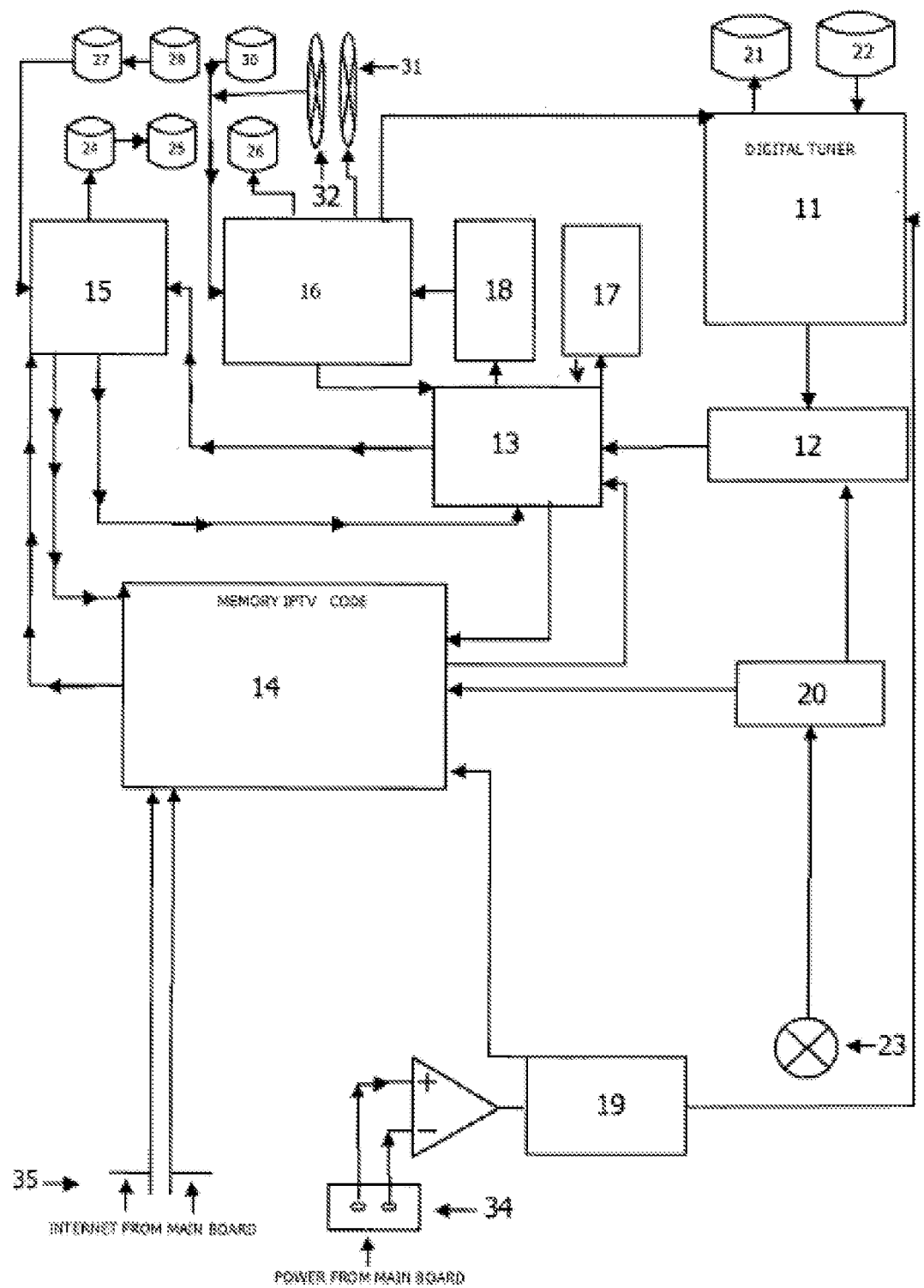
FIG. 5 is an example block diagram of the TV board assembly (TVBA) of a SMART TV in accordance with this application.

Referring to FIG. 5, video IPTV data packets from the FBA arrive at TVBA via input connection 35. These packets feed directly to memory IPTV code block 14 and processed by memory video processor element 13. The processed signals are coupled to memory decoded video block 18 and forwarded to memory block 16 which converts them to stream in an appropriate video display format. The stored video is coupled to video out connection 26 and from there transported to HDMI connection interface 31, digital tuner TV 11, tuner TV out interface 21.

Alternate signals sources may also be provided via video in connections 30 and 32. Here, separate video format signal streams feed into data memory 16. From memory 16, signals are received and processed by video processor block 13. Signals from board that contains buttons to control the operations like power on/off, volume, channels menu or others are fed to processor with SOC 14, IPTV code block 14, back to video processor block 13, and in similar fashion as before are forwarded on to memory decoded video block 18 and memory block 16.

Where connected coupled to 13, where connected coupled to 14, and where connected coupled to 20, is board of a Light Inverter Power Adapter LCD which receives a voltage input 100 v-240 v/ac, which makes a convert voltage, known as Light Inverter Power LCD Adapter with voltage output DC12V5A also to 20. Where connected coupled to 19, is board LCD Module or display Module which comprises Memory, EEPROM, Timing Control, CD Interface, DDR, SDRAMs, LVDS-Rx, Row Drivers, a connector for display panel or TFT LCD Panel, Column Drivers.

A separate TV signal input 22 communicates with digital tuner 11 which in turn is coupled to video processor data block 12. The signals from there are fed to memory decoded video block 18 and then memory 16 where they are converted in a manner similar to other streams to a format adaptable for interfacing with appropriate display media, via video out connection 26, or HDMI interface 31, or tuner TV out interface 21.

In an exemplary embodiment, memory element 17 is a separate storage memory. Video processor block 13 delivers data to be stored in element 17. In response to a command "recall data", data is transferred from memory 17 to video processor block 13 for immediate user availability.

Memory IP code block 14 also communicates with audio data convert block 15. Audio IP packets from audio data convert block 15 are received by audio out interfaces 24 and 25. Audio in interfaces 27 and 28 communicates with audio data converter 15 to receive external audio signals. These signals are filtered by filter 13 and returned to audio data convert block 15. From there, the feed is sent to memory IP code block 14 and back to audio data convert block 15. In this way, audio out signals are generated via audio out interfaces 24, 25 to a connected speaker system (not shown).

In another embodiment, LED 23 is provided to receive command from an external wireless remote control (not shown). The received LED signals are stored in memory 20 and processed to respond to appropriate remote control user commands. The different associated TV tasks, such as volume and channel selection are electronically processed by memory IPTV code block 14 to perform the selected, in this case, IPTV function.

In Digital TV mode, LED 23 receives user commands from the remote control, and via an interface to video processor data block 12, triggers block 12 to perform the selected digital TV function.

As with the FBA, main board includes a power supply is received a voltage input 100 v-240 v/ac or is received DC 5V/DC12V/DC19V via input power node connection 34. A voltage regulator 19 regulates the power supply signal and sources memory IPTV code block 14, video processor data block 12, and all associated TVBA elements.

Figure 6:
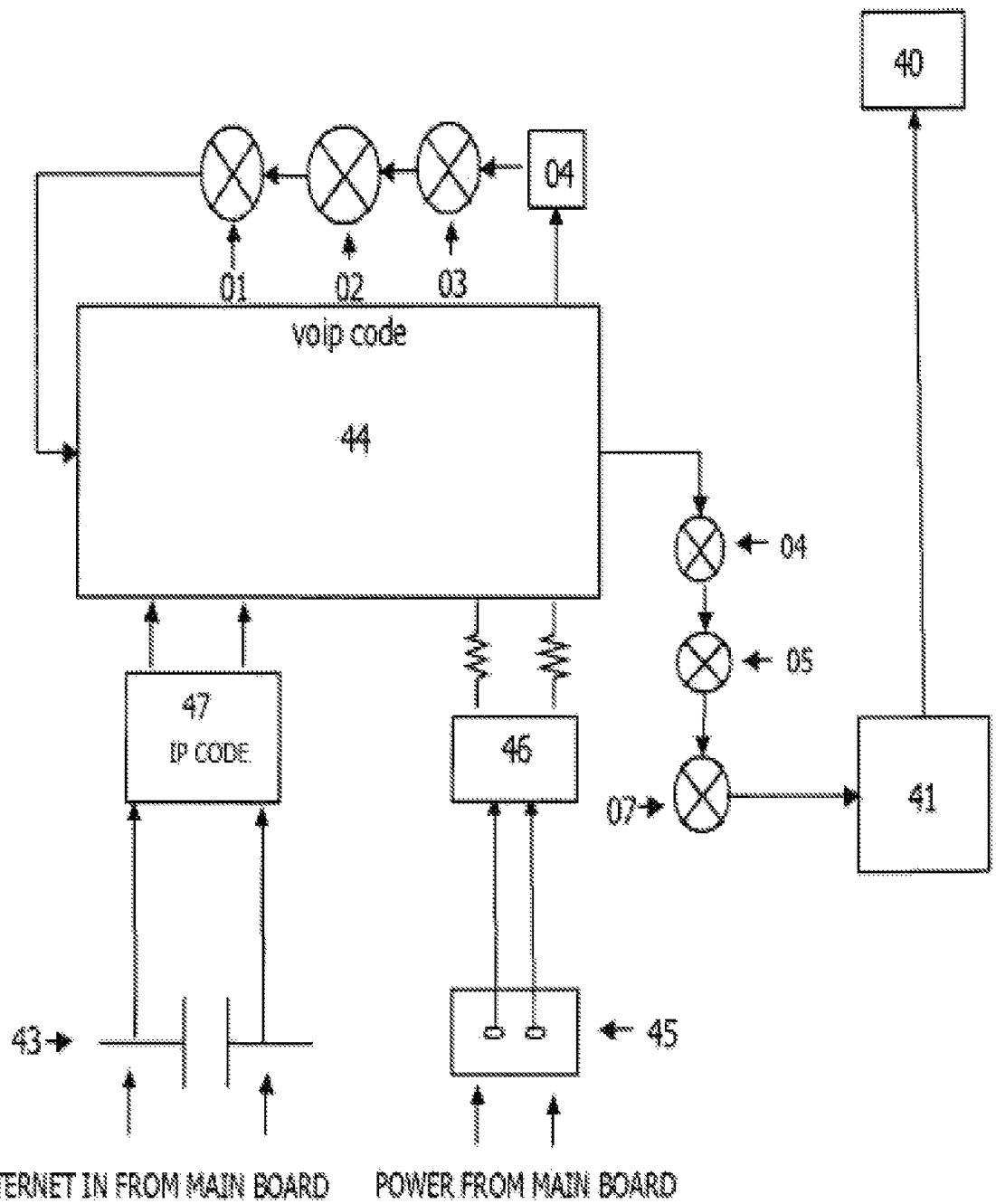
FIG. 6 is an example block diagram of the phone board assembly (PBA) of a SMART TV in accordance with this application.

FIG. 6, the phone board assembly, sets out the voice over IP (VoIP) functions supported by STB 100 or smart TV 300. Here, IP voice packets are received from output connection 97 (FIG. 4) which are fed directly from the main board (FIG. 3). These are received via input connection interface 43 which are then received and stored in IP code block 47.

The data from IP code block 47 is then processed and stored in VoIP code block 44 where it is separately converted into voice and data. From there, the associated information is received by a chain of voice filters (04+03+02+01) which clean the signal to improve quality. The cleaned voice signals are then sent back into VoIP code block 44, further filtered by data filters (05+06+07) and eventually transported to memory block 41 which functions to rectify associated voice and data signals, before transporting to output phone jack 40.

Power to the PBA is supplied from the main board (FIG. 3) through power input connection 45 and regulated by voltage regulator 46. The regulated voltage supply feeds power to VoIP code block 44 and other key components on PBA of STB 100 or SMART TV 300. The illustrative combination of elements shown in FIGS. 4 to 6, provide an improved IPTV STB 100 or SMART TV 300 that eliminates the wire to the home solutions of conventional STB or SMART TV.

Using multiple radio networks with which to establish wireless links to remote locations away from the home, most typically wide area network radio networks, such as 2G, 3G and 4G, 5G cellular radio networks, but in combined form, it is possible to replace satellite, cable and DSL links to the home in many cases.

In one or more exemplary embodiments, the functions described may be implemented in hardware, software, firmware, or any combination thereof. If implemented in software, the functions may be stored on or transmitted over as one or more instructions or code on a computer readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium, that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein. These and other systems, methods, objects, features, and advantages of the present disclosure will be apparent to those skilled in the art from the following detailed description of the embodiments and drawings.

All documents mentioned herein are hereby incorporated in their entirety by reference. References to items in the singular should be understood to include items in the floral, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

With respect to the above, it is to be understood that the invention is not limited in its application to the details of construction and to the arrangement of the components listed or the steps set forth in the description or illustrated in the drawings. The various apparatus and methods of the disclosed invention are capable of other embodiments, and of being practiced and carried out in various ways that would be readily known to those skilled in the art, given the present disclosure. Further, the terms and phrases used herein are for descriptive purposes and should not be construed as in any way limiting.

As such, those skilled in the art will appreciate that the conception upon which this disclosure is based by be utilized as a basis for designing other inventions with similar properties. It is important therefore that the embodiments, objects, and claims herein, be regarded as including such equivalent construction and methodology insofar as they do not depart from the spirit and scope of the present invention.

It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed:

1. A Television (TV) comprising:
a plurality of cellular wireless modem modules synchronized for simultaneously processing at least one provider's cellular internet protocol television (IPTV) signals from a plurality of cellular data networks wherein each wireless modem module is configured to receive a plurality of Third Generation (3G) to Fifth Generation (5G) cellular wireless broadband connection signals from said plurality of cellular data networks;
a plurality cellular wireless transceivers configured to receive and convert cellular signals into a plurality of sets of data signals from 3G to 5G cellular wireless broadband connection signals according to a different respective wireless communication standard;
a processor communicatively coupled to the plurality of cellular wireless modem modules, wherein the processor is configured to:
establish, using at least two of the plurality cellular wireless modem modules, a plurality of cellular wireless network links between the TV and at least one cellular data network;
receive, using each of the at least two cellular wireless modem modules, a respective set of data signals transmitted through one of the plurality of cellular wireless network links;
determine cellular wireless broadband connection signal strength associated with each set of data signals;
identify, from the plurality of sets of data signals, a set of data signals corresponding to a strongest cellular wireless broadband connection signal strength; and
determine an internet protocol television (IPTV) provider based on the set of data signals corresponding to the strongest cellular wireless broadband connection signal strength;
convert said set of data signals into IPTV output signals in accordance to the IPTV provider; and
a display unit communicatively coupled to the processor and adapted to receive the IPTV output signals, and to process the IPTV output signals to generate a multimedia content, and to render the generated multimedia content.

2. The TV of claim 1, wherein the plurality cellular wireless network links are concurrently established over a plurality of cellular networks.

3. The TV of claim 1, wherein the wireless communication standards include at least one of Millimeter Wave (mmWave), Long Term Evolution Advanced Pro (LTE-A Pro) 4.5G, 4.5G Pro, 4.9G, Pre-5G, 5G Project, Third Generation Partnership Project (3GPP) Long Term Evolution (LTE).

4. The SMART TV of claim 1, wherein the processor is further configured to:
obtain, through at least some of the cellular wireless network links, additional data from at least one content provider communicatively coupled to the at least one cellular wireless data network, wherein the at least one content provider is different from the IPTV provider; and
determine content data based on the additional data obtained from the at least one content provider.

5. The TV of claim 4, wherein the processor further comprises a content-license management module that manages agreements of content providers.

6. The TV of claim 5, wherein the content data comprises at least one set of data from a user application, a webpage, an e-mail message, video conferencing data, and voice over internet protocol (VOIP) data.

7. The TV of claim 1, wherein the cellular wireless network links include at least one of a broadcast link, a unicast link, and a multicast link.

8. The TV of claim 1, wherein the processor is configured to establish the plurality of cellular wireless network links between the TV and the at least one cellular wireless data network based on a quality of service (QoS) requirement.

9. The TV of claim 1, wherein the processor is configured to establish the plurality of cellular wireless network links between the TV and the at least one cellular wireless data network based on data traffic.

10. The TV of claim 1, wherein the at least one cellular wireless data network comprises at least two cellular wireless data networks; and wherein the processor is configured to establish the plurality of cellular wireless network links between the TV and the at least two cellular wireless data networks, wherein the at least two cellular wireless data networks are operated by at least two different cellular network carriers.

11. The TV of claim 1, further comprising a remote control for controlling operations of the SMART TV.

12. The TV of claim 1 comprising a memory, wherein the memory is adapted to store one or more computing applications, the display unit is adapted to execute at least one computing application, and on execution, the display unit is adapted to receive the signals corresponding to the IPTV signals, and to process the signals to generate a digital content, and to render the generated digital content.

13. The TV of claim 1 comprising a hotspot module and a wireless transmitter, wherein the hotspot module is adapted to extend at least one of the plurality of cellular wireless broadband signals to the wireless transmitter, wherein the wireless transmitter is further adapted to establish communication coupling to one more computing devices and adapted to transmit the cellular broadband signals to the computing devices.

14. The TV of claim 1, wherein the IPTV output signals correspond to a live and/or on-demand content.

15. The TV of claim 1, wherein the strength of the cellular wireless broadband connection is between 1 Gigabits per second (Gbps) to 20 Gbps.

16. The TV of claim 1, wherein at least one of the cellular data networks is carried on unlicensed spectrum.

17. The TV of claim 1, wherein the cellular IPTV signals are received through SIM cards installed on the TV.

\* \* \* \* \*